US008968142B2

(12) United States Patent
Lippert

(10) Patent No.: US 8,968,142 B2
(45) Date of Patent: Mar. 3, 2015

(54) MULTI-SPEED TRANSMISSION

(71) Applicant: Ford Global Technologies, LLC, Dearborn, MI (US)

(72) Inventor: Robert Scott Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/897,668

(22) Filed: May 20, 2013

(65) Prior Publication Data

US 2014/0342870 A1 Nov. 20, 2014

(51) Int. Cl.

| | |
|---|---|
| ***F16H 3/62*** | (2006.01) |
| ***F16H 3/44*** | (2006.01) |
| ***F16H 37/06*** | (2006.01) |

(52) U.S. Cl.

CPC .......................................... *F16H 3/62* (2013.01)
USPC ............ 475/275; 475/296; 475/317; 475/330

(58) Field of Classification Search

CPC ................ F16H 2200/2012; F16H 2200/0065; F16H 2200/2046

See application file for complete search history.

(56) References Cited

U.S. PATENT DOCUMENTS

| | | | | |
|---|---|---|---|---|
| 8,047,951 | B2 * | 11/2011 | Wittkopp et al. | 475/282 |
| 2002/0183160 | A1 | 12/2002 | Kao et al. | |
| 2005/0176550 | A1 * | 8/2005 | Bucknor et al. | 475/275 |
| 2006/0068965 | A1 * | 3/2006 | Gumpoltsberger | 475/275 |
| 2007/0213168 | A1 * | 9/2007 | Gumpoltsberger | 475/275 |
| 2008/0300092 | A1 | 12/2008 | Phillips et al. | |
| 2009/0011891 | A1 * | 1/2009 | Phillips et al. | 475/275 |
| 2009/0048059 | A1 * | 2/2009 | Phillips et al. | 475/275 |
| 2009/0192010 | A1 | 7/2009 | Wittkopp et al. | |
| 2009/0215580 | A1 | 8/2009 | Hart et al. | |
| 2009/0312139 | A1 * | 12/2009 | Jang et al. | 475/275 |
| 2010/0210405 | A1 | 8/2010 | Phillips et al. | |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — David D Le
*Assistant Examiner* — Timothy Hannon
(74) *Attorney, Agent, or Firm* — James Dottavio; Brooks Kushman P.C.

(57) ABSTRACT

A transmission gearing arrangement produces nine forward speed ratios and one reverse speed ratio by selective engagement of three shift elements in various combinations. Some embodiment includes four simple planetary gear sets and six shift elements of which one is a brake. Another embodiment includes two axis transfer gear pairs in place of one of the planetary gear sets.

19 Claims, 4 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

In a first embodiment, a transmission includes first, second, and third gearing arrangements. The first gearing arrangement fixedly constrains a first shaft to rotate faster than an input shaft and in a same direction. The first gearing arrangement may be, for example, a simple planetary gear set. Alternatively, the first gearing arrangement may be, as another example, a collection of axis transfer gears in combination with a clutch. The second gearing arrangement selectively imposes a linear speed relationship between a second shaft, the input shaft, and an output shaft. The second gearing arrangement may be, for example, a simple planetary gear set in combination with a clutch. The third gearing arrangement fixedly imposes a linear speed relationship between a third shaft, the output shaft, and a fourth shaft. The third gearing arrangement may be, for example, a simple planetary gear set. The transmission may further comprise a brake and second, third, and fourth clutches. The transmission may additionally comprise a fourth gearing arrangement, which may be a simple planetary gear set in combination with a clutch.

In a second embodiment, a transmission includes a gearing arrangement and first, second, and third simple planetary gear sets, first, second, and third clutches, and a brake. The gearing arrangement fixedly constrains a first shaft to rotate faster than an input shaft and in a same direction. The first gearing arrangement may be, for example, a fourth simple planetary gear set. Alternatively, the gearing arrangement may be, as another example, a collection of axis transfer gears in combination with a clutch. The first simple planetary gear set selectively imposes a linear speed relationship between the first shaft, a second shaft, and the third shaft. The second simple planetary gear set selectively imposes a linear speed relationship between the second shaft, the input shaft, and an output shaft. The third simple planetary gear set fixedly imposes a linear speed relationship between a third shaft, the output shaft, and a fourth shaft. The transmission may further include fourth and fifth clutches.

DETAILED DESCRIPTION

Figure 1:
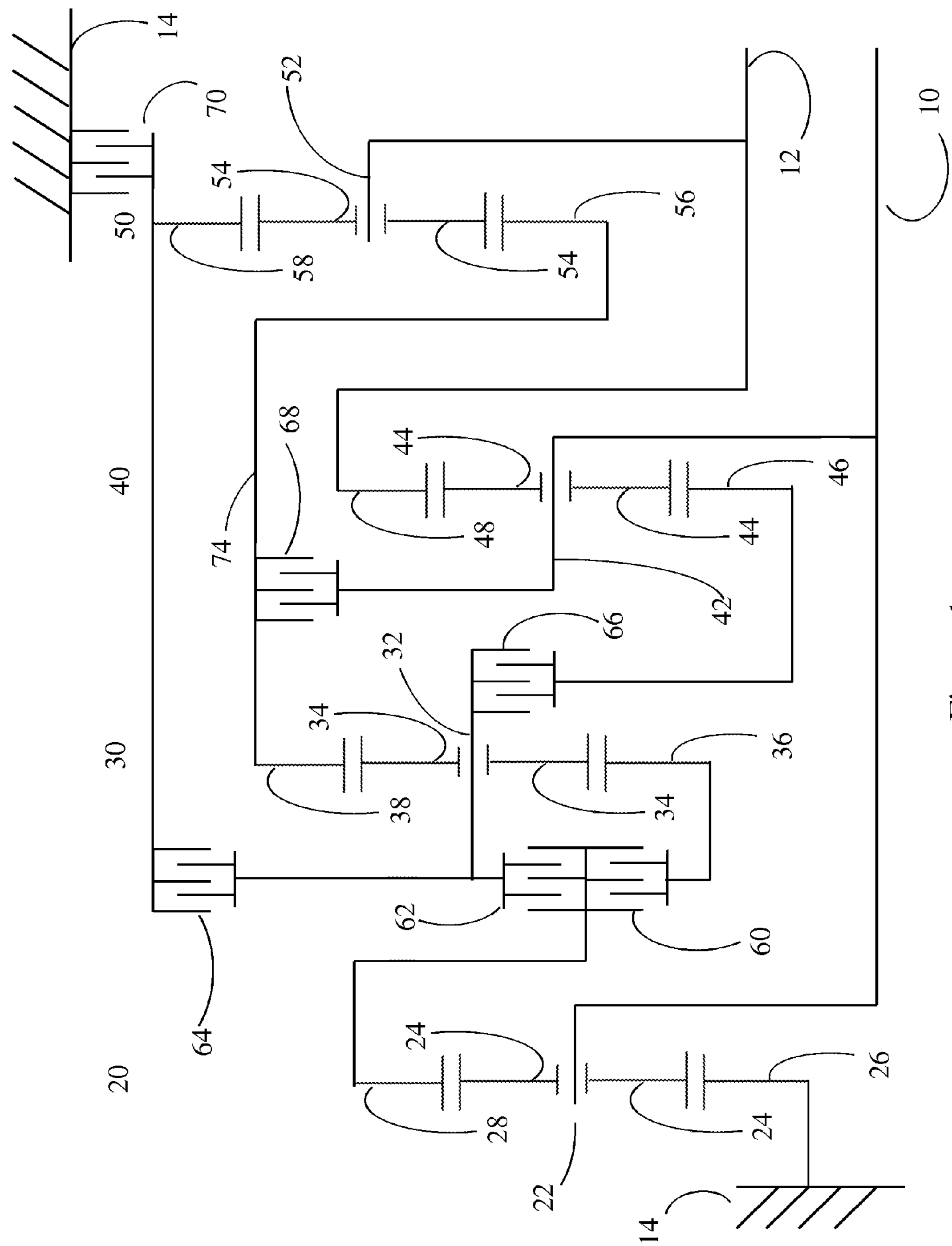
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An example transmission is schematically illustrated in FIG. 1. The transmission utilizes four simple planetary gear sets 20, 30, 40, and 50. A planet carrier 32 rotates about a central axis and supports a set of planet gears 34 such that the planet gears rotate with respect to the planet carrier. External gear teeth on the planet gears mesh with external gear teeth on a sun gear 36 and with internal gear teeth on a ring gear 38. The sun gear and ring gear are supported to rotate about the same axis as the carrier. Gear sets 20, 40, and 50 are similarly structured.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

A suggested ratio of gear teeth for each planetary gear set is listed in Table 1.

TABLE 1

| | |
|---|---|
| Ring 28/Sun 26 | 1.729 |
| Ring 38/Sun 36 | 1.624 |
| Ring 48/Sun 46 | 2.274 |
| Ring 58/Sun 56 | 3.430 |

In the transmission of FIG. 1, input shaft 10 is fixedly coupled to carrier 22 and carrier 42 and selectively coupled to intermediate shaft 74 by clutch 68. Intermediate shaft 74 is fixedly coupled to ring gear 38 and sun gear 56. Output shaft 12 is fixedly coupled to carrier 52 and ring gear 48. Sun gear 26 is fixedly held against rotation. Sun gear 36 is selectively coupled to ring gear 28 by clutch 60. Carrier 32 is selectively coupled to ring gear 28 by clutch 62, to ring gear 58 by clutch 64, and to sun gear 46 by clutch 66. Ring gear 58 is selectively held against rotation by brake 70.

Various combinations of gear sets, clutches, and brakes selectively impose particular speed relationships. Gear set 20 fixedly imposes an overdrive relationship between carrier 22 and ring gear 28. In other words, ring gear 28 is constrained to rotate faster than carrier 22 and in the same direction in all operating conditions. The combination of gear set 40 and clutch 66 selectively imposes various speed relationships between carrier 32, input shaft 10, and output shaft 12. Engaging clutch 66 couples sun gear 46 to carrier 32 and imposes a linear speed relationship between carrier 32, input shaft 10, and output shaft 12. Gear set 50 fixedly imposes a linear speed relationship between sun gear 56, output shaft 12, and ring gear 58. The combination of gear set 30 and clutches 60, 62, 64, and 66 selectively imposes various speed relationships between ring gear 28, carrier 32, and sun gear 56. Engaging clutch 60 couples sun gear 36 to ring gear 28 and, in combination with engaging at least one of clutches 62, 64, and 66, imposes a linear speed relationship between ring gear 28, carrier 32, and sun gear 56.

As shown in Table 2, engaging the shift elements in combinations of three establishes nine forward speed ratios and one reverse speed ratio between input shaft 10 and output shaft 12. An X indicates that the shift element is required to establish the speed ratio. When the gear sets have tooth number ratios as indicated in Table 1, the speed ratios have the values indicated in Table 2.

TABLE 2

| | 60 | 62 | 64 | 66 | 68 | 70 | Ratio | Step |
|---|---|---|---|---|---|---|---|---|
| Rev. | X | | X | | | X | −4.558 | 103% |
| 1st | X | | | | X | X | 4.430 | |
| 2nd | X | X | | | | X | 2.807 | 1.58 |
| 3rd | X | | | X | | X | 1.877 | 1.50 |
| 4th | X | X | | X | | | 1.341 | 1.40 |
| 5th | X | | | X | X | | 1.107 | 1.21 |
| 6th | | | X | X | X | | 1.000 | 1.11 |
| 7th | X | | X | | X | | 0.854 | 1.17 |
| 8th | | X | X | | X | | 0.691 | 1.24 |
| 9th | X | X | X | | | | 0.634 | 1.09 |

When the driver selects drive (forward), the transmission is prepared for vehicle launch in 1st by engaging clutches 60 and 68 and brake 70. A shift to 2nd may be accomplished by gradually disengaging clutch 68 while gradually engaging clutch 62. Additional upshifts are accomplished according to Table 2. When the driver selects reverse, the transmission is prepared for vehicle launch in reverse by engaging clutches 60 and 64 and brake 70.

Figure 2:
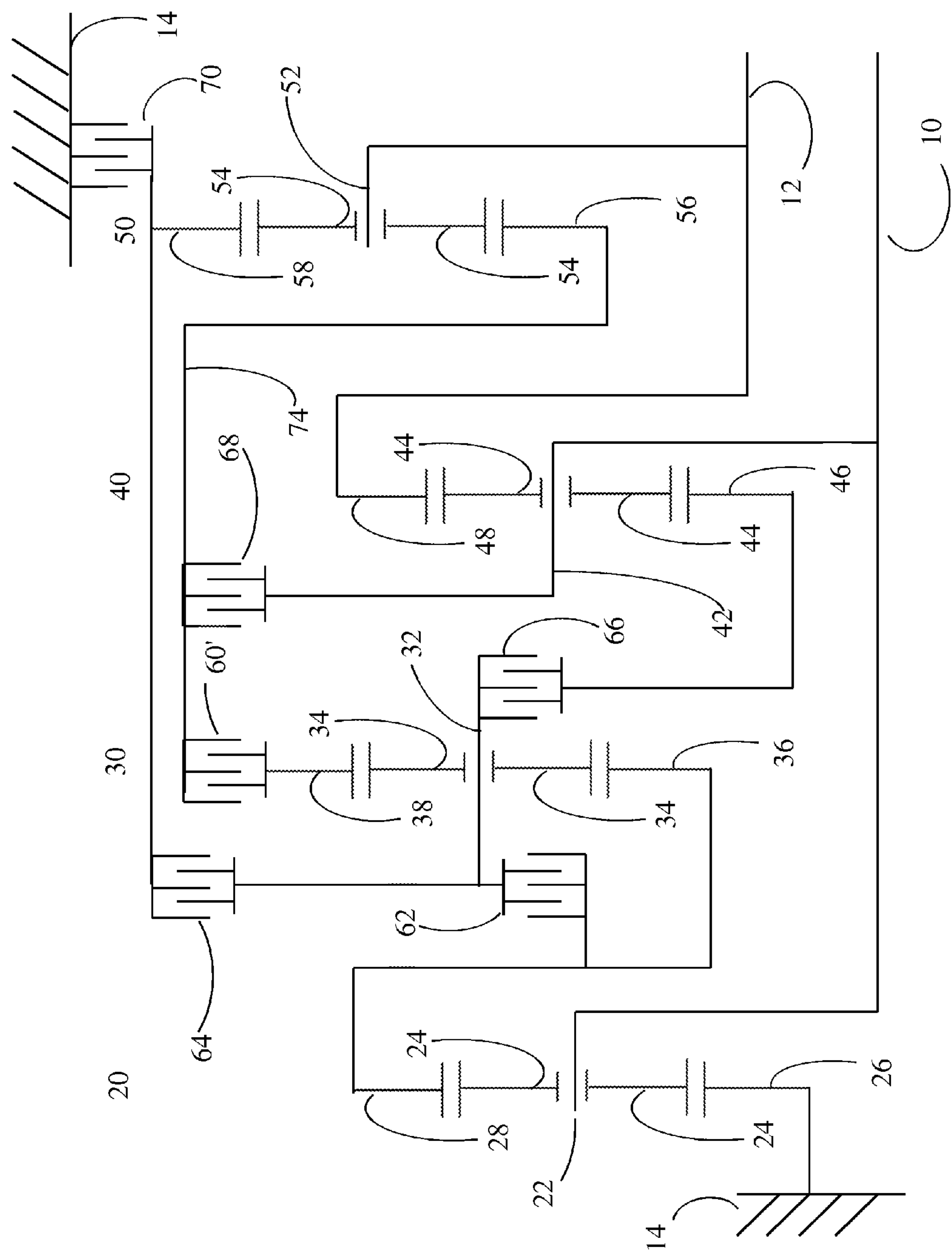
FIG. 2 is a schematic diagram of a second transmission gearing arrangement.

A second example transmission is illustrated in FIG. 2. This transmission utilizes four simple planetary gear sets with suggested tooth number ratios as shown in Table 1. In this transmission, input shaft 10 is fixedly coupled to carrier 22 and carrier 42 and selectively coupled to intermediate shaft 74 by clutch 68. Intermediate shaft 74 is fixedly coupled to sun gear 56 and selectively coupled to ring gear 38 by clutch 60'. Output shaft 12 is fixedly coupled to carrier 52 and ring gear 48. Sun gear 26 is fixedly held against rotation. Sun gear 36 is fixedly coupled to ring gear 28. Carrier 32 is selectively coupled to ring gear 28 by clutch 62, to ring gear 58 by clutch 64, and to sun gear 46 by clutch 66. Ring gear 58 is selectively held against rotation by brake 70. The transmission of FIG. 2 is operated in the same fashion as the transmission of FIG. 1.

Various combinations of gear sets, clutches, and brakes selectively impose particular speed relationships. Gear set 20 fixedly imposes an overdrive relationship between carrier 22 and ring gear 28. In other words, ring gear 28 is constrained to rotate faster than carrier 22 and in the same direction in all operating conditions. The combination of gear set 40 and clutch 66 selectively imposes various speed relationships between carrier 32, input shaft 10, and output shaft 12. Engaging clutch 66 couples sun gear 46 to carrier 32 and imposes a linear speed relationship between carrier 32, input shaft 10, and output shaft 12. Gear set 50 fixedly imposes a linear speed relationship between sun gear 56, output shaft 12, and ring gear 58. The combination of gear set 30 and clutches 60', 62, 64, and 66 selectively imposes various speed relationships between ring gear 28, carrier 32, and sun gear 56. Engaging clutch 60' couples ring gear 38 to intermediate shaft 74 and, in combination with engaging at least one of clutches 62, 64, and 66, imposes a linear speed relationship between ring gear 28, carrier 32, and sun gear 56.

Figure 3:
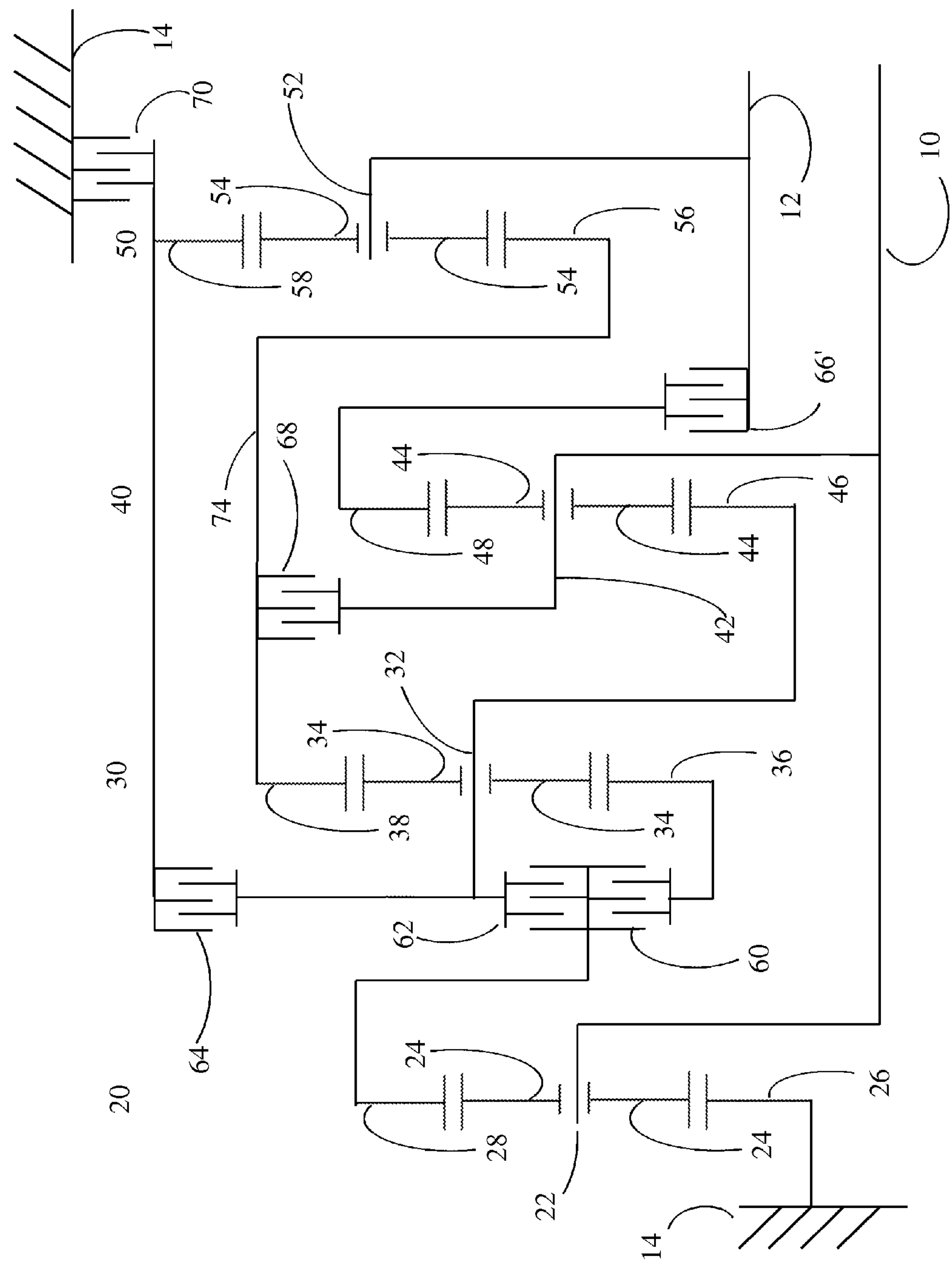
FIG. 3 is a schematic diagram of a third transmission gearing arrangement.

A third example transmission is illustrated in FIG. 3. This transmission utilizes four simple planetary gear sets with suggested tooth number ratios as shown in Table 1. In this transmission, input shaft 10 is fixedly coupled to carrier 22 and carrier 42 and selectively coupled to intermediate shaft 74 by clutch 68. Intermediate shaft 74 is fixedly coupled to ring gear 38 and sun gear 56. Output shaft 12 is fixedly coupled to carrier 52 and selectively coupled to ring gear 48 by clutch 66'. Sun gear 26 is fixedly held against rotation. Sun gear 36 is selectively coupled to ring gear 28 by clutch 60. Carrier 32 is fixedly coupled to sun gear 46 and selectively coupled to ring gear 28 by clutch 62 and to ring gear 58 by clutch 64. Ring gear 58 is selectively held against rotation by brake 70. The transmission of FIG. 3 is operated in the same fashion as the transmissions of FIGS. 1 and 2.

Various combinations of gear sets, clutches, and brakes selectively impose particular speed relationships. Gear set 20 fixedly imposes an overdrive relationship between carrier 22 and ring gear 28. In other words, ring gear 28 is constrained to rotate faster than carrier 22 and in the same direction in all operating conditions. The combination of gear set 40 and clutch 66' selectively imposes various speed relationships between carrier 32, input shaft 10, and output shaft 12. Engaging clutch 66' couples ring gear 48 to the output shaft and imposes a linear speed relationship between carrier 32, input shaft 10, and output shaft 12. Gear set 50 fixedly imposes a linear speed relationship between sun gear 56, output shaft 12, and ring gear 58. The combination of gear set 30 and clutches 60, 62, 64, and 66' selectively imposes various speed relationships between ring gear 28, carrier 32, and sun gear 56. Engaging clutch 60 couples sun gear 36 to ring gear 28 and, in combination with engaging at least one of clutches 62, 64, and 66', imposes a linear speed relationship between ring gear 28, carrier 32, and sun gear 56.

Figure 4:
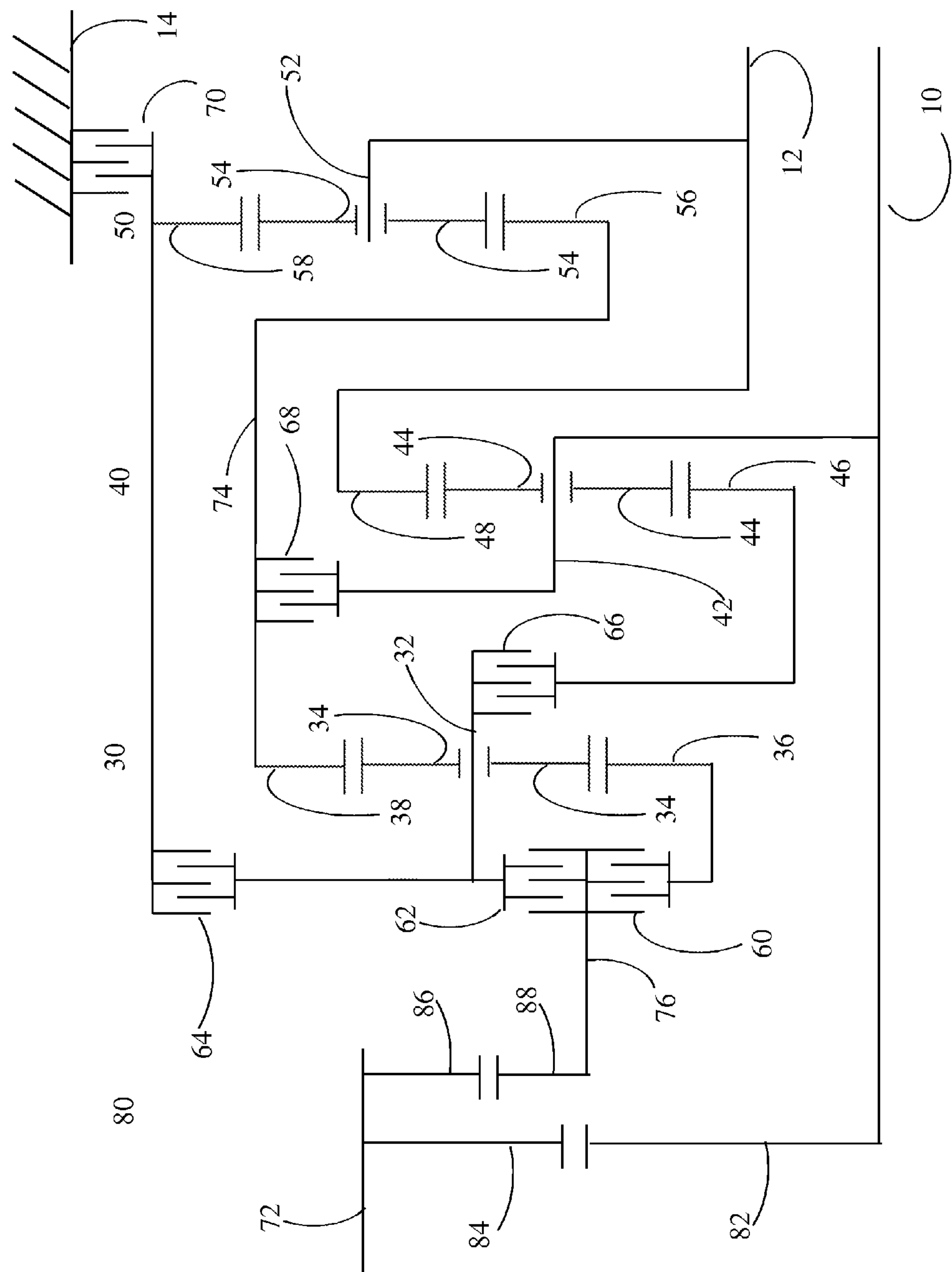
FIG. 4 is a schematic diagram of a fourth transmission gearing arrangement.

A fourth example transmission is illustrated in FIG. 4. This transmission utilizes three simple planetary gear sets 30, 40, and 50 with suggested tooth number ratios as indicated in Table 1. These simple planetary gear sets have a sun gear, a ring gear, and a carrier that rotate about a central axis. Additionally, axis transfer gears 82 and 88 are supported for rotation about this central axis. Gear 82 is radially larger than gear 88. Layshaft 72 is parallel to the central axis but offset from the central axis. Axis transfer gears 84 and 86 are supported for rotation about the axis of layshaft 72. Axis transfer gears 84 and 86 continuously mesh with axis transfer gears 82 and 88 respectively.

Input shaft 10 is fixedly coupled to axis transfer gear 82 and carrier 42 and selectively coupled to intermediate shaft 74 by clutch 68. Intermediate shaft 74 is fixedly coupled to ring gear 38 and sun gear 56. Intermediate shaft 76 is fixedly coupled to axis transfer gear 88. Output shaft 12 is fixedly coupled to carrier 52 and ring gear 48. Sun gear 36 is selectively coupled to intermediate shaft 76 by clutch 60. Carrier 32 is selectively coupled to intermediate shaft 76 by clutch 62, to ring gear 58 by clutch 64, and to sun gear 46 by clutch 66. Ring gear 58 is selectively held against rotation by brake 70. This arrangement may be suitable for front wheel drive transmissions in which an axis transfer from the engine axis to the differential axis is required. The transmission of FIG. 4 is operated in the same fashion as the transmissions of FIGS. 1-3.

The combination of axis transfer gears 82, 84, 86, and 88 impose an overdrive relationship between input shaft 10 and intermediate shaft 76. In other words, intermediate shaft 76 is constrained to rotate faster than input shaft 10 and in the same direction. The combination of gear set 40 and clutch 66 selectively imposes various speed relationships between carrier 32, input shaft 10, and output shaft 12. Engaging clutch 66 couples sun gear 46 to carrier 32 and imposes a linear speed relationship between carrier 32, input shaft 10, and output shaft 12. Gear set 50 fixedly imposes a linear speed relationship between sun gear 56, output shaft 12, and ring gear 58. Ring gear 58 may be selectively held against rotation by engaging or disengaging brake 70. Sun gear 56 may be selectively constrained to rotate at the same speed as input shaft 10 and in the same direction by engaging or disengaging clutch 68. The combination of gear set 30 and clutches 60, 62, 64, and 66 selectively imposes various speed relationships between intermediate shaft 76, carrier 32, and sun gear 56. Engaging clutch 60 couples sun gear 36 to intermediate shaft 76 and, in combination with engaging at least one of clutches 62, 64, and 66, imposes a linear speed relationship between ring gear 28, carrier 32, and sun gear 56.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:

a first gearing arrangement which continuously fixedly constrains a first shaft to rotate faster than an input shaft and in a same direction;

a second gearing arrangement which selectively imposes a linear speed relationship in order of a second shaft, the input shaft, and an output shaft; and a third gearing arrangement which fixedly imposes a linear speed relationship in order of a third shaft, the output shaft, and a fourth shaft.

2. The transmission of claim 1, wherein the first gearing arrangement comprises:

a first simple planetary gear set having a first sun gear fixedly coupled to a transmission housing, a first ring gear fixedly coupled to the first shaft, a first planet carrier fixedly coupled to the input shaft, and at least one planet gear supported for rotation on the first planet carrier and in continuous meshing engagement with the first sun gear and the first ring gear.

3. The transmission of claim 1, wherein the second gearing arrangement comprises:

a second simple planetary gear set having a second sun gear, a second ring gear fixedly coupled to the output shaft, a second planet carrier fixedly coupled to the input shaft, and at least one planet gear supported for rotation on the second planet carrier and in continuous meshing engagement with the second sun gear and the second ring gear; and a first clutch configured to selectively couple the second sun gear to the second shaft.

4. The transmission of claim 1, wherein the second gearing arrangement comprises:

a second simple planetary gear set having a second sun gear, a second ring gear fixedly coupled to the output shaft, a second planet carrier fixedly coupled to the input shaft, and at least one planet gear supported for rotation on the second planet carrier and in continuous meshing engagement with the second sun gear and the second ring gear; and a first clutch configured to selectively couple the second ring gear to the output shaft.

5. The transmission of claim 1, wherein the third gearing arrangement comprises:

a third simple planetary gear set having a third sun gear fixedly coupled to the third shaft, a third ring gear fixedly coupled to the fourth shaft, a third planet carrier fixedly coupled to the output shaft, and at least one planet gear supported for rotation on the third planet carrier and in continuous meshing engagement with the third sun gear and the third ring gear.

6. The transmission of claim 1, further comprising:

a brake configured to selectively hold the fourth shaft against rotation;

a second clutch configured to selectively couple the third shaft to the input shaft;

a third clutch configured to selectively couple the first shaft to the second shaft; and a fourth clutch configured to selectively couple the second shaft to the fourth shaft.

7. The transmission of claim 1, further comprising:

a fourth gearing arrangement which selectively imposes a linear speed relationship in order of the first shaft, the second shaft, and the third shaft.

8. The transmission of claim 7, wherein the fourth gearing arrangement comprises:

a fourth simple planetary gear set having a fourth sun gear, a fourth ring gear fixedly connected to the third shaft, a fourth planet carrier fixedly coupled to the second shaft, and at least one planet gear supported for rotation on the fourth planet carrier and in continuous meshing engagement with the fourth sun gear and the fourth ring gear; and a fifth clutch configured to selectively couple the fourth sun gear to the first shaft.

9. The transmission of claim 7, wherein the fourth gearing arrangement comprises:

a fourth simple planetary gear set having a fourth sun gear fixedly coupled to the first shaft, a fourth ring gear, a fourth planet carrier fixedly coupled to the second shaft, and at least one planet gear supported for rotation on the fourth planet carrier and in continuous meshing engagement with the fourth sun gear and the fourth ring gear; and a fifth clutch configured to selectively couple the fourth ring gear to the third shaft.

10. The transmission of claim 1, wherein the first gearing arrangement comprises:

a layshaft substantially parallel to the input shaft;

a first axis transfer gear coupled to the input shaft;

a second axis transfer gear coupled to the layshaft and in continuous meshing engagement with the first axis transfer gear;

a third axis transfer gear coupled to the first shaft; and a fourth axis transfer gear coupled to the layshaft and in continuous meshing engagement with the third axis transfer gear.

11. The transmission of claim 10, further comprising:

a third clutch configured to selectively couple the layshaft to the second shaft.

12. The transmission of claim 10, further comprising:

a fourth simple planetary gear set having a fourth sun gear fixedly coupled to the first shaft, a fourth ring gear, a fourth planet carrier fixedly coupled to the second shaft, and at least one planet gear supported for rotation on the fourth planet carrier and in continuous meshing engagement with the fourth sun gear and the fourth ring gear; and a fifth clutch configured to selectively couple the fourth sun gear to the layshaft.

13. A transmission comprising:

an input shaft;

an output shaft;

first, second, third, and fourth shafts;

a gearing arrangement which fixedly constrains the first shaft to rotate faster than the input shaft and in a same direction;

a first simple planetary gear set having a first sun gear, a first ring gear, a first planet carrier fixedly coupled to the second shaft, and at least one planet gear supported for rotation on the first planet carrier and in continuous meshing engagement with the first sun gear and the first ring gear, the first planetary gear set configured to selectively impose a linear speed relationship between the first shaft, the second shaft, and the third shaft;

a second simple planetary gear set having a second sun gear, a second ring gear, a second planet carrier, and at least one planet gear supported for rotation on the second planet carrier and in continuous meshing engagement with the second sun gear and the second ring gear, the second planetary gear set configured to selectively impose a linear speed relationship between the second shaft, the input shaft, and the output shaft;

a third simple planetary gear set having a third sun gear fixedly coupled to the third shaft, a third ring gear fixedly coupled to the fourth shaft, a third planet carrier fixedly coupled to the output shaft, and at least one planet gear supported for rotation on the third planet carrier and in continuous meshing engagement with the third sun gear and the third ring gear;

a first clutch configured to selectively couple the first shaft and the second shaft;

a second clutch configured to selectively couple the second shaft and the fourth shaft;

a third clutch configured to selectively couple the input shaft and the third shaft; and a brake configured to selectively hold the fourth shaft against rotation.

14. The transmission of claim 13, wherein the gearing arrangement comprises:

a fourth simple planetary gear set having a fourth sun gear fixedly coupled to a transmission housing, a fourth ring gear fixedly coupled to the first shaft, a fourth planet carrier fixedly coupled to the input shaft, and at least one planet gear supported for rotation on the fourth planet carrier and in continuous meshing engagement with the fourth sun gear and the fourth ring gear.

15. The transmission of claim 14, further comprising a fourth clutch configured to selectively couple the first sun gear to the first shaft and a fifth clutch configured to selectively couple the second sun gear to the second shaft, wherein the first ring gear is fixedly coupled to the third shaft and the second ring gear is fixedly coupled to the output shaft.

16. The transmission of claim 14, further comprising a fourth clutch configured to selectively couple the first ring gear to the third shaft and a fifth clutch configured to selectively couple the second sun gear to the second shaft, wherein the first sun gear is fixedly coupled to the first shaft and the second ring gear is fixedly coupled to the output shaft.

17. The transmission of claim 14, further comprising a fourth clutch configured to selectively couple the first sun gear to the first shaft and a fifth clutch configured to selectively couple the second ring gear to the output shaft, wherein the second sun gear is fixedly coupled to the second shaft and the first ring gear is fixedly coupled to the third shaft.

18. The transmission of claim 13, wherein the first gearing arrangement comprises:

a layshaft substantially parallel to the input shaft;

a first axis transfer gear coupled to the input shaft;

a second axis transfer gear coupled to the layshaft and in continuous meshing engagement with the first axis transfer gear;

a third axis transfer gear coupled to the first shaft; and a fourth axis transfer gear coupled to the layshaft and in continuous meshing engagement with the third axis transfer gear.

19. The transmission of claim 13, further comprising a fourth clutch configured to selectively couple the first sun gear to the first shaft and a fifth clutch configured to selectively couple the second sun gear to the second shaft, wherein the first ring gear is fixedly coupled to the third shaft and the second ring gear is fixedly coupled to the output shaft.

* * * * *